United States Patent
Yoo et al.

(10) Patent No.: US 11,798,131 B2
(45) Date of Patent: Oct. 24, 2023

(54) METHOD FOR PROCESSING IMAGE FOR IMPROVING THE QUALITY OF THE IMAGE AND APPARATUS FOR PERFORMING THE SAME

(71) Applicant: NALBI INC., Seoul (KR)

(72) Inventors: Jae Young Yoo, Incheon (KR); Sang Ho Lee, Daejeon (KR)

(73) Assignee: NALBI INC., Seoul (KR)

( * ) Notice: Subject to any disclaimer, the term of this patent is extended or adjusted under 35 U.S.C. 154(b) by 308 days.

(21) Appl. No.: 16/936,749

(22) Filed: Jul. 23, 2020

(65) Prior Publication Data
US 2020/0349673 A1 Nov. 5, 2020

Related U.S. Application Data

(63) Continuation of application No. PCT/KR2019/000978, filed on Jan. 23, 2019.

(30) Foreign Application Priority Data

Jan. 23, 2018 (KR) .................. 10-2018-0008506
Jan. 23, 2019 (KR) .................. 10-2019-0008645

(51) Int. Cl.
*G06T 3/40* (2006.01)
*G06T 5/00* (2006.01)
(Continued)

(52) U.S. Cl.
CPC .......... *G06T 3/4046* (2013.01); *G06N 3/045* (2023.01); *G06N 3/08* (2013.01); *G06T 5/003* (2013.01);
(Continued)

(58) Field of Classification Search
CPC . G06T 2207/20084; G06T 2207/20081; G06T 3/4053; G06T 3/4046; G06T 5/001;
(Continued)

(56) References Cited

U.S. PATENT DOCUMENTS 10,645,384 B2* 5/2020 Nishida .................. H04N 19/36
2007/0058873 A1* 3/2007 Kondo .................... H04N 19/60
375/E7.176
(Continued)

FOREIGN PATENT DOCUMENTS

JP 2005033667 A 2/2005
KR 20110049570 A * 5/2011
(Continued)

OTHER PUBLICATIONS

Cho, English Translation KR20110049570A (Year: 2011).*
(Continued)

*Primary Examiner* — Ian L Lemieux
*Assistant Examiner* — Woo C Rhim
(74) *Attorney, Agent, or Firm* — Dinsmore & Shohl LLP; Yongsok Choi, Esq.

(57) ABSTRACT

A method of processing an image for improving image quality is provided. The method includes inputting an image into a first artificial neural network as an input variable to create a feature map and inputting an image into a second artificial neural network as an input variable to create an estimated class probability distribution map for each of frequency channels. Further, the method may comprise determining a class for each of the frequency channels on the basis of a probability distribution included in the estimated class probability distribution map, creating an estimated class map that includes a determined class, converting the estimated class map into an estimated frequency map, combining the estimated frequency map with the feature map to create a combined feature map, and inputting the combined feature map into a third artificial neural network as an input variable to create an output image.

8 Claims, 10 Drawing Sheets

(51) Int. Cl.
*G06N 3/08* (2023.01)
*G06N 3/045* (2023.01)

(52) U.S. Cl.
CPC ............... *G06T 2207/20081* (2013.01); *G06T 2207/20084* (2013.01)

(58) Field of Classification Search
CPC ......... G06T 5/003; G06T 5/10; G06T 3/0087; G06T 5/20; G06K 9/00523; G06K 9/6267; G06K 9/00536; G06V 10/82; G06V 10/40; G06V 40/172; G06V 10/454; G06N 3/045; G06N 3/08
See application file for complete search history.

(56) References Cited

U.S. PATENT DOCUMENTS

| | | | | |
|---|---|---|---|---|
| 2009/0060340 | A1* | 3/2009 | Zhou | G06V 20/10 382/190 |
| 2017/0061246 | A1 | 3/2017 | Chen et al. | |
| 2017/0169313 | A1* | 6/2017 | Choi | G06K 9/6267 |
| 2018/0096457 | A1* | 4/2018 | Savvides | G06F 16/50 |
| 2018/0268250 | A1* | 9/2018 | Drozdova | G06V 10/764 |
| 2018/0336662 | A1* | 11/2018 | Kimura | G06T 3/4084 |
| 2019/0066346 | A1* | 2/2019 | Ye | G06T 11/006 |
| 2019/0102678 | A1* | 4/2019 | Chang | G06K 9/6298 |
| 2020/0098100 | A1* | 3/2020 | Inoue | G06T 3/0012 |

FOREIGN PATENT DOCUMENTS

| | | |
|---|---|---|
| KR | 1020110049570 A | 5/2011 |
| KR | 101780057 B1 | 9/2017 |
| KR | 101791573 B1 | 10/2017 |
| KR | 20180010950 A * | 1/2018 |

OTHER PUBLICATIONS

Yes, English Translation KR20180010950A (Year: 2018).*
International Search Report of PCT/KR2019/000978 dated Apr. 29, 2019.

* cited by examiner

METHOD FOR PROCESSING IMAGE FOR IMPROVING THE QUALITY OF THE IMAGE AND APPARATUS FOR PERFORMING THE SAME

CROSS-REFERENCE TO RELATED APPLICATIONS

This application is a continuation of International Application No. PCT/KR2019/000978 filed on Jan. 23, 2019, which claims priority to Korean Patent Application No. 10-2018-0008506 filed on Jan. 23, 2018 and Korean Patent Application No. 10-2019-0008645 filed on Jan. 23, 2019, the entire contents of which are incorporated by reference.

TECHNICAL FIELD

This disclosure relates to techniques for processing an image to improve a quality of the image.

BACKGROUND ART

As the Internet has become an essential element in daily life, the need for image compression has increased. Furthermore, with an increasing interest in the high-resolution images or videos, many studies are conducted on the techniques for receiving images of a specific resolution and improving the resolution of the received images. This is because the quality of the image and the amount of data are closely related to each other. The widely used ways to reduce network load is to use the image compression technology, or to receive images with a relatively low resolution to reduce communication data.

However, the compressed image has a problem of blurry edges, and because the compression technology does not provide a reverse conversion technology to restore the original image after the image is compressed, once the image is compressed and distributed, it is difficult to restore the image into a clearer image even when such is necessary. Therefore, restoring high-quality images from the compressed image has become an important field in recent computer vision technologies. Such a restoration issue has also been recognized as an important issue for the image resolution enhancement technology.

Among various image compression technologies, JPEG is the most commonly used lossy compression format. The JPEG format involves conversion of an image into the frequency domain by discrete cosine transform (DCT) and compression by quantization. According to the DCT, signals are concentrated in the low-frequency domain while the signals are weak in the high-frequency domain. The low frequency domain indicates a weak color change in the image, and the high frequency domain indicates a strong color change in the image. The quantization is processed by ignoring the high-frequency domain as much as possible. While a human eye is sensitive to the low-frequency components, it is not so sensitive to the high-frequency components, and accordingly, a certain amount of high-frequency domain can be omitted without causing a considerably perceivable difference in the image quality. Therefore, the JPEG format provides a lossy compression effect by removing detailed information in the high frequency domain.

By "lossy compression", it means that the scale is reduced through the process of removing a portion of data. Accordingly, the reverse process of the compression in the image restoration is basically about creating data that is not in the input image, and this causes the problem of poor result. In addition, in many cases, there is a problem in that there are a plurality of corresponding images that can be output from a given input image.

Since the convolutional neural networks (CNN) technology was actively applied in the field of computer vision technology, many attempts have been made to use CNN to recover information lost due to lossy compression. The related art using CNN roughly obtains a mapping function that connects an input image to an output image through the supervised learning using CNN. In many cases, this is done by minimizing the mean squared error (MSE) or mean absolute error (MAE) between the output image and the target image. However, the output images by these approaches have the issue of looking blurry to the human eye. This is because detailed information in the high-frequency domain of the image has been lost. Meanwhile, since the loss minimization functions such as MSE and MAE are based on the difference in pixel values between the output and the target, it is difficult to effectively restore the edges or textures where the loss in the high-frequency domain has occurred.

SUMMARY

Technical Problem

An object of the present disclosure is to provide a method of restoring a blurry compressed image into a clearer image or improving a resolution of an image having a specific resolution by using a trained artificial neural network, and a method of training such an artificial neural network.

Technical Solution

According to an embodiment of the present disclosure, a method of processing an image for improving image quality, which is run on a computing device, may include inputting the image into a first artificial neural network as an input variable to create a feature map, inputting the image to a second artificial neural network as an input variable to create an estimated class probability distribution map for each of frequency channels. In addition, the method may further include determining a class for each of the frequency channels on the basis of a probability distribution included in the estimated class probability distribution map and creating an estimated class map that includes a determined class, converting the estimated class map into an estimated frequency map, concatenating the estimated frequency map with the feature map to create a concatenated feature map, and inputting the concatenated feature map into a third artificial neural network as an input variable to create an output image.

According to an embodiment of the present disclosure, a method of training an artificial neural network, which is run on a computing device and used to create a class map for improving image quality, may include creating a ground truth frequency map for each of the frequency channels by applying a conversion function to a training ground truth image, and converting the ground truth frequency map into a ground truth class map. The method of training an artificial neural network may include inputting a training image corresponding to the training ground truth image to the artificial neural network as an input variable to create a training estimated class probability distribution map for each of the frequency channels, determining a class for each of the frequency channels based on a probability distribution included in the training estimated class probability distribution map and creating a training estimated class map that includes the determined class, and training the artificial neural network in order to minimize loss between the training estimated class map and the ground truth class map.

According to an embodiment of the present disclosure, a computing device that processes an image to improve image quality may include an encoder configured to input the image to a first artificial neural network as an input variable to create a feature map, a frequency processing module configured to receive the image and create an estimated frequency map based on the image, a concatenating module configured to concatenate the estimated frequency map with the feature map to create a concatenated feature map, a decoder configured to input the concatenated feature map into a third artificial neural network as an input variable to create an output image. The frequency processing module may include a classifier configured to input the image to the second artificial neural network as an input variable to create an estimated class probability distribution map for each of the frequency channels, a class determination module configured to determine a class for each of the frequency channels based on a probability distribution included in the estimated class probability distribution map to create an estimated class map that includes the determined class, and a class-to-coefficient conversion module configured to convert the estimated class map into an estimated frequency map.

Effects of the Invention

According to some embodiments of the present disclosure, a technique that employs classification rather than regression may be utilized in restoring the compressed image or increasing the resolution of the image, by creating and using a class probability distribution map, and accordingly, a restored image or an image having a higher resolution can be obtained while minimizing the load on the computer.

According to some embodiments of the present disclosure, in restoring the lost data through the trained artificial neural network, by converting the pixel domain into the frequency domain and processing the same, there is an effect that lost part of the high-frequency domain can be restored or a higher-resolution image can be created.

According to some exemplary embodiments of the present disclosure, by converting a training ground truth image and performing training and creating a result with a focus on an edge and a texture, it is possible to obtain a restored image with clearer edge and texture or an image with a higher resolution.

DETAILED DESCRIPTION

Figure 1:
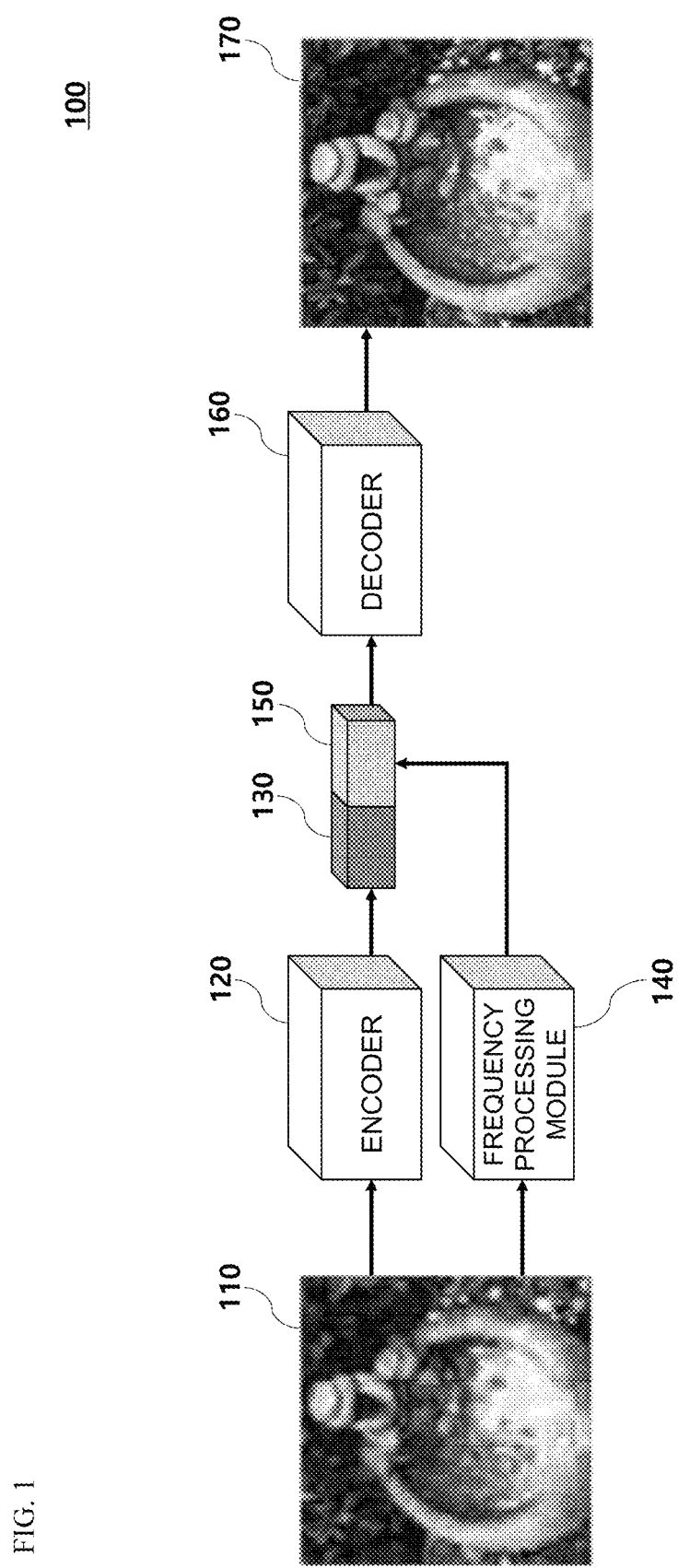
FIG. 1 is a schematic diagram showing a method of processing an image to improve image quality, which is run on a computing device, according to an embodiment of the present disclosure.

Hereinafter, specific details for the practice of the present disclosure will be described in detail with reference to the accompanying drawings. However, in the following description, detailed descriptions of well-known functions or configurations will be omitted when it may make the subject matter of the present disclosure rather unclear.

In the accompanying drawings, the same or corresponding components are given the same reference numerals. In addition, in the following description of the embodiments, duplicate descriptions of the same or corresponding elements may be omitted. However, even if descriptions of components are omitted, it is not intended that such components are not included in any embodiment.

Advantages and features of the disclosed embodiments and methods of accomplishing the same will be apparent by referring to embodiments described below in connection with the accompanying drawings. However, the present disclosure is not limited to the embodiments disclosed below, and may be implemented in various different forms, and the present embodiments are merely provided to make the present disclosure complete, and to fully disclose the scope of the invention to those skilled in the art to which the present disclosure pertains.

The terms used herein will be briefly described prior to describing the disclosed embodiments in detail.

The terms used herein have been selected as general terms which are widely used at present in consideration of the functions of the present disclosure, and this may be altered according to the intent of an operator skilled in the art, conventional practice, or introduction of new technology. In addition, in a specific case, a term is arbitrarily selected by the applicant, and the meaning of the term will be described in detail in a corresponding description of the embodiments. Therefore, the terms used in the present disclosure should be defined based on the meaning of the terms and the overall contents of the present disclosure rather than a simple name of each of the terms.

As used herein, the singular forms "a," "an," and "the" are intended to include the plural forms as well, unless the context clearly indicates the singular forms. Further, the plural forms are intended to include the singular forms as well, unless the context clearly indicates the plural forms.

Further, throughout the description, when a portion is stated as "comprising (including)" a component, it intends to mean that the portion may additionally comprise (or include or have) another component, rather than excluding the same, unless specified to the contrary.

Furthermore, the term "unit" or "module" used herein denotes a software or hardware component, and the "unit" or "module" performs certain roles. However, the meaning of the "unit" or "module" is not limited to software or hardware. The "unit" or "module" may be configured to be in an addressable storage medium or configured to execute one or more processors. Accordingly, as an example, the "unit" or 'module' includes components such as software components, object-oriented software components, class components, and task components, processes, functions, attributes, procedures, subroutines, program code segments of program code, drivers, firmware, micro-codes, circuits, data, database, data structures, tables, arrays, and variables. Furthermore, functions provided in the components and the "units" or "module" may be combined as a smaller number of components and "units" or "module", or further divided into additional components and "units" or "module".

According to an embodiment of the present disclosure, the "unit" or "module" may be implemented as a processor and a memory. The term "processor" should be interpreted broadly to encompass a general-purpose processor, a central processing unit (CPU), a microprocessor, a digital signal processor (DSP), a controller, a microcontroller, a state machine, and the like. Under some circumstances, a "processor" may refer to an application-specific integrated circuit (ASIC), a programmable logic device (PLD), a field-programmable gate array (FPGA), and the like. The term "processor" may refer to a combination of processing devices, e.g., a combination of a DSP and a microprocessor, a plurality of microprocessors, one or more microprocessors in conjunction with a DSP core, or a combination of any other such configuration.

As used herein, the term "server" or "client" may include "server device" or "client device", respectively.

The term "memory" should be interpreted broadly to encompass any electronic component capable of storing electronic information. The term "memory" may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, and the like. The memory is said to be in electronic communication with a processor if the processor can read information from and/or write information to the memory. The memory that is integral to a processor is in electronic communication with the processor.

In addition, the term "image" refers to an image that includes one or more pixels, and when the entire image is divided into a plurality of local patches, may refer to one or more divided local patches.

In addition, the term "map" refers to a set of a plurality of numbers such that, for example, a map may represent a plurality of numbers in the form of a matrix or vector. In addition, "XX map" may refer to a set of numerical values representing or characterizing "XX".

In the present disclosure, a solution to a problem of restoring an image, and more specifically, a solution to a problem of restoring an edge or a texture of an object in a JPEG compressed image, is provided. In order to accurately restore the high frequency domain lost in the image compression process, the problem of image restoration is mainly dealt with in the frequency domain. In this process, the probability distribution in the frequency domain is extracted through an artificial neural network trained using cross entropy loss. In the present disclosure, unlike the conventional techniques using adversarial training, the problem of image restoration is treated as a problem of classification such that the determination of coefficients in the frequency domain is solved by obtaining a frequency section, that is, a quantized class.

Among the techniques for processing image to improve image quality, the problem of restoring a lossy compressed image may be, in most cases, solved by selecting the most suitable output image among the possible output images, since there are a plurality of corresponding images that can be output from a given input image. As such, the problem of image restoration can be considered as a problem of obtaining a probability distribution according to an input image. Therefore, the problem of image restoration may be solved by obtaining a probability distribution of the frequency data of the restored image through the artificial neural network. More specifically, a discrete probability distribution for a plurality of quantized classes may be used. In an embodiment of the present disclosure, a method of restoring an image by creating an estimated class probability distribution map is provided. The technical configuration used to restore the compressed image may also be applied to a configuration that increases the resolution of the image.

FIG. 1 is a schematic diagram showing a method 100 of processing an image to improve image quality, which is run on a computing device, according to an embodiment of the present disclosure. Here, the computing device may include an embedded device such as a smartphone or a television, a client device, a server device, a device equipped with a processor implementing the method 100 of processing an image as a hardware logic, and the like.

An image 110 may be a lossy compressed image or an image having a specific resolution (e.g., Full HD, and the like). In an embodiment, the lossy compression refers to partial loss, transformation, etc. of the data or information corresponding to the compressed image 110 that occurs as the image is converted according to a conversion function into a reduced image file size. For example, the compressed image 110 may be an image compressed according to JPEG, MPEG, H.264, Bilinear, Inter Area, and the like.

In the present disclosure, applying a conversion function may include not only a method of converting data according to mathematical expression, but also a method of quantizing, sampling, or increasing the resolution of an image, and combinations thereof. According to an embodiment, applying a conversion function to an image may include converting from a spatial domain to a frequency domain. For example, the conversion function may include Discrete Cosine Transformation (DCT), Discrete Fourier Transformation (DFT), Fast Fourier Transformation (FFT), and the like. According to another embodiment, applying a conversion function to an image may include improving the resolution of the image. For example, the conversion function may include any functions (e.g., interpolation, machine learning, functions applied to artificial neural networks, and the like) applied to improve the resolution of an image.

In addition, the quantization may involve dividing a numerical range into a plurality of sections and assigning the values corresponding to each section with a single value, and it may be a concept that includes a method of calculating a quantization matrix or the like on data or numeric value, and then assigning the values with one values according to their corresponding sections. For example, this may involve dividing values corresponding to 0 to 255 into four sections and assigning the values with 0 to 3, or rounding the values up or off to the nearest number, or truncating digit(s) right of decimal point or certain digit in JPEG. Furthermore, the quantization may include calculating a quantization matrix and the like on data or numerical values and then processing the values according to their corresponding sections.

Furthermore, the image 110 may represent an entire image or a local patch which is a partial image divided from the entire image. For the purpose of effective use of an artificial neural network, it is common to divide an image to input and output it in units of local patch.

An encoder 120 may receive the image 110 and create an estimated feature map 130. According to an embodiment, the encoder 120 may include a trained artificial neural network (first artificial neural network) and may be configured to input the image 110 to the trained artificial neural network as an input variable and create the estimated feature map 130. The feature map 130 may include a set of numbers (e.g., matrix, vectors) configured to represent the features of an image.

A frequency processing module 140 may receive the image 110, calculate classes representing frequencies included in the image 110 as quantized values, and estimate frequencies based on the calculated class values. In this example, the frequencies may mainly include high frequencies in the image, for example.

The frequency processing module 140 may receive the image 110 and create an estimated frequency map 150. According to an embodiment, the frequency processing module 140 may include a trained artificial neural network (second artificial neural network) and may be configured to input the image 110 to the trained artificial neural network as an input variable and create the estimated frequency map 150. In this example, the frequency map 150 expresses the features of an image in the frequency domain, and may have various forms such as a matrix, vectors, or the like. In order to create the frequency map 150, the frequency processing module 140 may input the image 110 to the second artificial neural network as an input variable to create an estimated discrete class probability distribution map for each of the frequency channels. Here, the estimated class probability distribution map may include a probability distribution that includes probabilities for each class of each of the frequency channels. Here, each of the frequency channels may represent each of a plurality of frequency ranges. According to an embodiment, each frequency channel may have the same frequency range. According to another embodiment, each frequency channel may have different frequency ranges. In addition, these frequency ranges may be predetermined, and each frequency channel does not include overlapping frequencies.

The frequency processing module 140 may be configured to determine a class for each of the frequency channels on the basis of the probability distribution included in the estimated class probability distribution map, and create an estimated class map that includes the determined class. The frequency processing module 140 may include a map representing a relationship between classes and coefficients, and inputting the created estimated class map to the map may result in conversion into an estimated coefficient map. In addition, the resultant estimated coefficient map may be converted into an estimated frequency map, and the converted estimated frequency map may be concatenated with the estimated feature map 130 created from the encoder 120 so that a concatenated estimated feature map may be provided to a decoder 160.

The decoder 160 may be configured to receive a concatenated estimated feature map in which the estimated frequency map 150 and the estimated feature map 130 are concatenated and create an output image 170. According to an embodiment, the decoder 160 may include a trained artificial neural network (third artificial neural network) and may be configured to input the concatenated feature map into the trained artificial neural network as an input variable to create the output image 170.

According to an embodiment, at least two of the first artificial neural network, the second artificial neural network, and the third artificial neural network may be configured to include the same or similar internal components. Alternatively, each of the first artificial neural network, the second artificial neural network, and the third artificial neural network may be configured to include different internal components.

Figure 2:
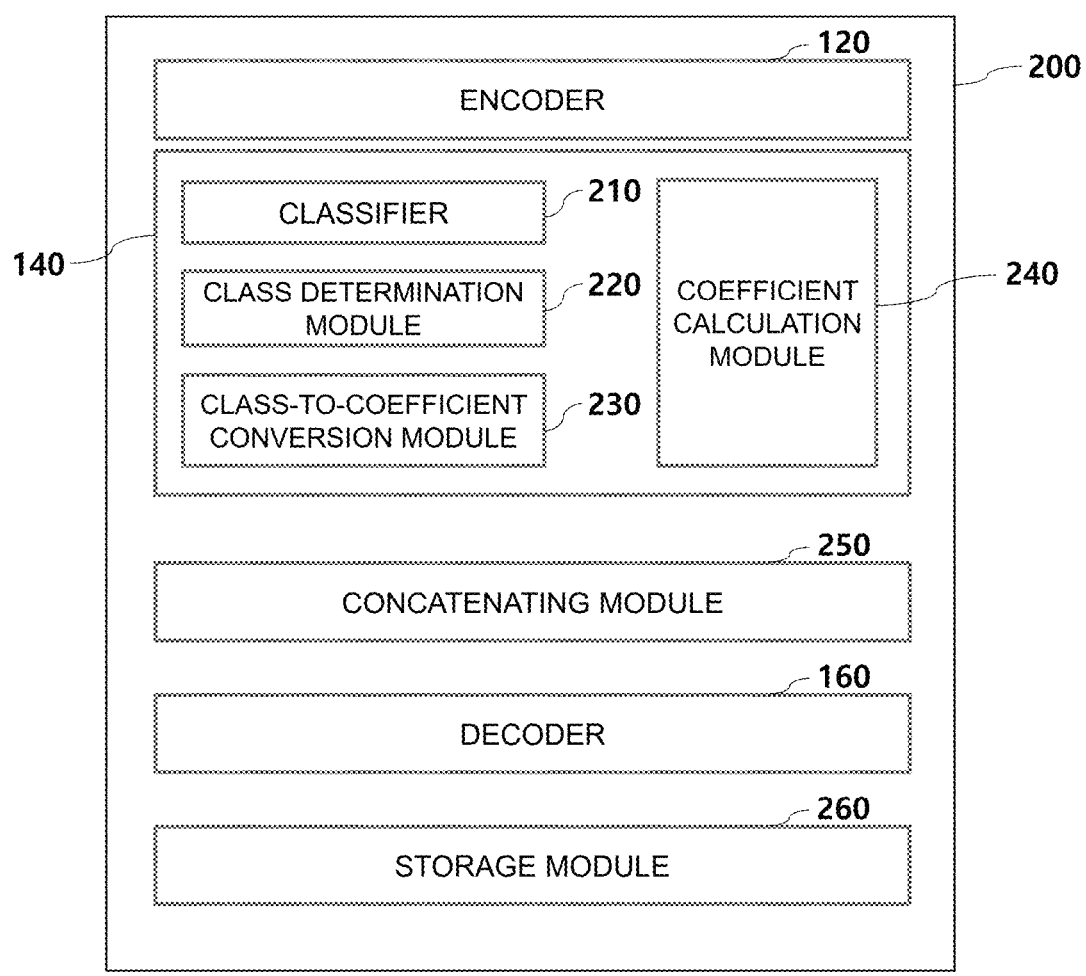
FIG. 2 is a block diagram showing a configuration of a computing device that processes an image to improve image quality according to an embodiment of the present disclosure.

FIG. 2 is a block diagram showing a configuration of a computing device 200 that processes an image according to an embodiment of the present disclosure. According to an embodiment, the computing device 200 that processes an image may include the encoder 120, the frequency processing module 140, a concatenating module 250, the decoder 160, and a storage module 260.

The encoder 120 may be configured to create an estimated feature map 130 from the image 110 and provide the created estimated feature map 130 to the concatenating module 250. According to an embodiment, likewise a feature extractor that is part of a classifier 210, the configuration of the encoder 120 may include a convolution layer of an artificial neural network such as CNN.

The frequency processing module 140 may be configured to receive the image 110 and create the estimated frequency map 150 based on the image 110. As shown in FIG. 2, the frequency processing module 140 may include the classifier 210, a class determination module 220, a class-to-coefficient conversion module 230, and a coefficient calculation module 240.

The classifier 210 may be configured to receive the image 110 and create an estimated class probability distribution map, and may include a processing device, and the like. According to an embodiment, the classifier 210 may include an artificial neural network and be trained and may subsequently include a trained artificial neural network. For example, the classifier 210 may include CNN and the like as an artificial neural network for image processing.

The class determination module 220 may determine one class from each probability distribution of the estimated class probability distribution map and create an estimated class map. Furthermore, the estimated class map may be provided to the class-to-coefficient conversion module. In the training process, the estimated class map may be provided to the classifier, or a loss between the estimated class map and the ground truth class map may be obtained and provided to the classifier. When the image is a local patch, the class determination module 220 may be configured to concatenate the estimated class maps of each local patch to create an estimated class map of the entire image.

The class-to-coefficient conversion module 230 may be configured to convert a class value into a coefficient value or convert the coefficient value into the class value. According to an embodiment, an estimated class map may be converted into an estimated coefficient map, and a ground truth coefficient map may be converted into a ground truth class map. Here, the coefficient map expresses the features of an image as coefficients in the frequency domain, and may have various forms such as matrix of coefficients, vectors, and the like. Furthermore, an estimated frequency map may be created based on the created estimated coefficient map. For example, the matrix-type estimated frequency map may be created based on the vector-type estimated coefficient map. Alternatively, the created estimated coefficient map may be used as the estimated frequency map.

According to an embodiment, converting a coefficient value into a class value is a kind of quantization, and the class values may be converted into coefficient values that are a plurality of discontinuous values. For example, coefficients less than 3 may be converted to class 0, coefficients between 3 and 6 to class 1, coefficients between 6 and 9 to class 2, coefficients between 9 and 12 to class 3, coefficients between 12 and 15 to class 4, coefficients between 15 and 18 to class 5, and coefficients above 30 to class 6. In this example, the number of classes is expressed as seven, but the number of classes may be appropriately adjusted (e.g., to odd number) to derive an optimal result. In addition, the ranges of the coefficients are described above by way of example, and any number may be determined according to the ranges calculated by the class-to-coefficient conversion module.

According to an embodiment, when a class value is converted into a coefficient value, the class value may be converted into a representative coefficient value, or the like of a section represented by the class. For example, class 0 may be converted to a coefficient 5, class 1 to a coefficient 20, and class 2 to a coefficient 35. According to an embodiment, in determining the coefficient value for conversion, a trained artificial neural network may be used, or statistics may be used.

The coefficient calculation module 240 may receive an image and create a frequency map. According to an embodiment, such a frequency map may include a coefficient map of the image. According to another embodiment, the step of creating the frequency map may include creating a coefficient map of the image. For example, the coefficient calculation module 240 may convert and/or vectorize the received image and create a frequency map, and further create a coefficient map. Likewise, the coefficient calculation module 240 may convert by DCT a training ground truth image into a ground truth frequency map, and vectorize the result to create a ground truth coefficient map. Here, the training ground truth image may include an image corresponding to the training image. According to an embodiment, when the training image is a compressed image, the training ground truth image may include a restored image of the training image. According to another embodiment, when the training image is an image having a specific resolution (e.g., FHD), the training ground truth image may be an image having a higher resolution (e.g., 4K or 8K) than the training image.

The concatenating module 250 may concatenate the frequency map with the feature map to create a concatenated feature map and provide the result to the decoder. Here, the "concatenating" refers to intercorrelating the feature map and the frequency map to form a single map. For example, the concatenating may include concatenation, sum, matrix product, and the like. Further, the concatenating module 250 may be configured to input a coefficient map or a frequency map into a separate artificial neural network to create a converted frequency map to be concatenated into a feature map.

The decoder 160 may receive the feature map concatenated with the frequency map and create an output image. In this example, when the compressed image is provided as the input image, the output image may include an image obtained by restoring the compressed image. Alternatively, when the input image is an image having a specific resolution, the output image may include an image with an improved resolution of the image. According to an embodiment, the decoder 160 may include a trained artificial neural network. In an embodiment, the decoder 160 may be configured symmetrically with the encoder 120, except that there is no activation function after the output convolution layer.

The storage module 260 may store program codes. The storage module 260 may be configured to provide the program codes to the encoder, the decoder, and the classifier, or to receive and store processed program codes. For example, it may include an HDD, an SSD, and the like.

Figure 3:
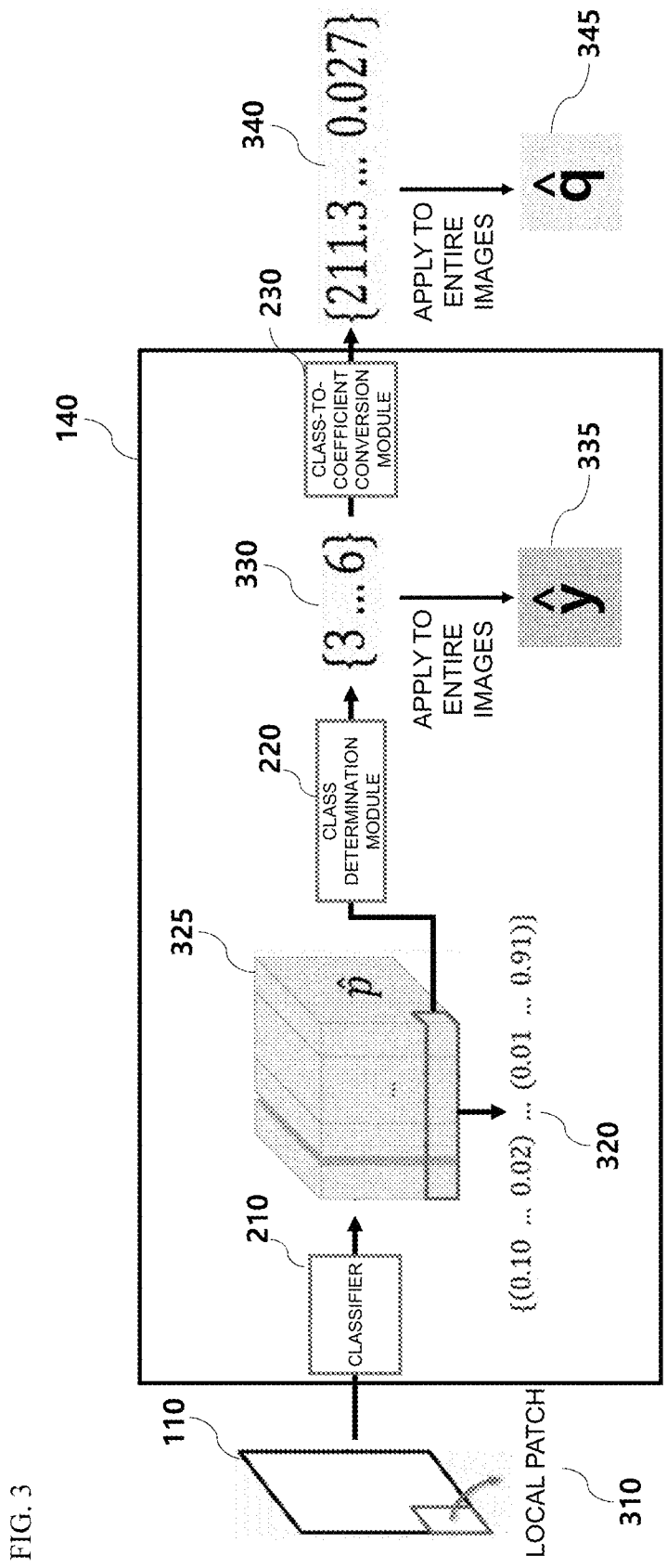
FIG. 3 is a schematic diagram showing a method of a frequency processing module of inputting an image to a trained artificial neural network as an input variable to create an estimated discrete class probability distribution map, and creating an estimated class map and an estimated coefficient map based on the result according to an embodiment of the present disclosure.

FIG. 3 is a schematic diagram showing a method of the frequency processing module 140 of inputting an image to a trained artificial neural network as an input variable to create an estimated discrete class probability distribution map, and creating an estimated class map and an estimated coefficient map based on the result according to an embodiment of the present disclosure. The frequency processing module 140 may receive the image 110 and create an estimated coefficient map 345 or an estimated frequency map 150. According to an embodiment, a local patch 310 that is part of the image is input, and the frequency processing module 140 may create an estimated coefficient map or an estimated frequency map of the local patch 310. For example, the local patch 310 may be a part divided from an image of 4×4, 8×8 or 16×16 pixels. In this case, the estimated coefficient map or the estimated frequency map may be created by iterating the process for each of all the local patches 310 included in the image 110, and the estimated coefficient map 345 or the estimated frequency map 150 for the image 110 may be created based on the created estimated coefficient map or estimated frequency map.

The classifier 210 may be configured to receive the image 110. According to an embodiment, the classifier 210 may input the image 110 into the trained artificial neural network as an input variable to create the estimated class probability distribution map 325 as an output vector. In an embodiment, the image inputting may be performed for each of the image channels, in which case the classifier 210 may create an estimated class probability distribution map 325 for each of the image channels.

The estimated class probability distribution map 325 may include a probability distribution that includes the probabilities for each class in the frequency domain. When the image inputting is performed for each image channel, the estimated class probability distribution map 325 may include a probability distribution that includes the probabilities for each class for each of the frequency channels. For example, (0.10 . . . 0.02) shown in FIG. 3 may indicate the probability distribution of the corresponding data for each class. That is, it may indicate 10% probability of corresponding to the first class and 2% probability of corresponding to the last class. In the embodiment shown in FIG. 3, the estimated class probability distribution map 325 may include probability distribution that includes the probabilities for each class for each of the frequency channels.

The class determination module 220 may receive the estimated class probability distribution map 325 and determine a class for each probability distribution based on the probability distribution included therein to create an estimated class map 335. When the estimated class probability distribution map 320 of the local patch is received, the estimated class map 330 of the local patch may be created. According to an embodiment, the class determination module 220 may determine a class according to a certain function. For example, the class determination module 220 may include an argmax function that determines the class with the highest probability out of each probability distribution. FIG. 3 shows that the classes with the highest probability out of the probability distributions for 7 classes (0 to 6) are selected. FIG. 3 shows that, for the estimated class map 330, the class 3 having the highest probability out of the probability distribution (0.10 . . . 0.02) is determined, and the class 6 with the highest probability out of the probability distribution (0.01 . . . 0.91) is determined. As the estimated class probability distribution map 325 is processed by the class determination module, the estimated class map 335 including the estimated classes as data may be created. In the case of reception at the classifier 210 in units of the local patch 310, it is possible to create the estimated class map 335 of the entire image by concatenating the created estimated class maps 330 of the local patch. When the class determination module 220 receives the estimated class probability distribution map 325 for each of the image channels, the class determination module 220 may create the estimated class map 335 for each of the image channels.

The class-to-coefficient conversion module converts the class into the coefficient. FIG. 3 shows that the estimated class map 330 of the local patch is input to the class-to-coefficient conversion module 230 and the estimated coefficient map 340 of the local patch is created. In the drawing, a coefficient 211.3 corresponding to class 3 is determined and a coefficient 0.027 corresponding to class 6 is determined, and the class values are thus converted to the coefficient values. When the class-to-coefficient conversion module 230 receives the estimated class map 335 for each of the image channels, the class-to-coefficient conversion module 230 may create the estimated coefficient map 345 for each of the image channels.

Figure 4:
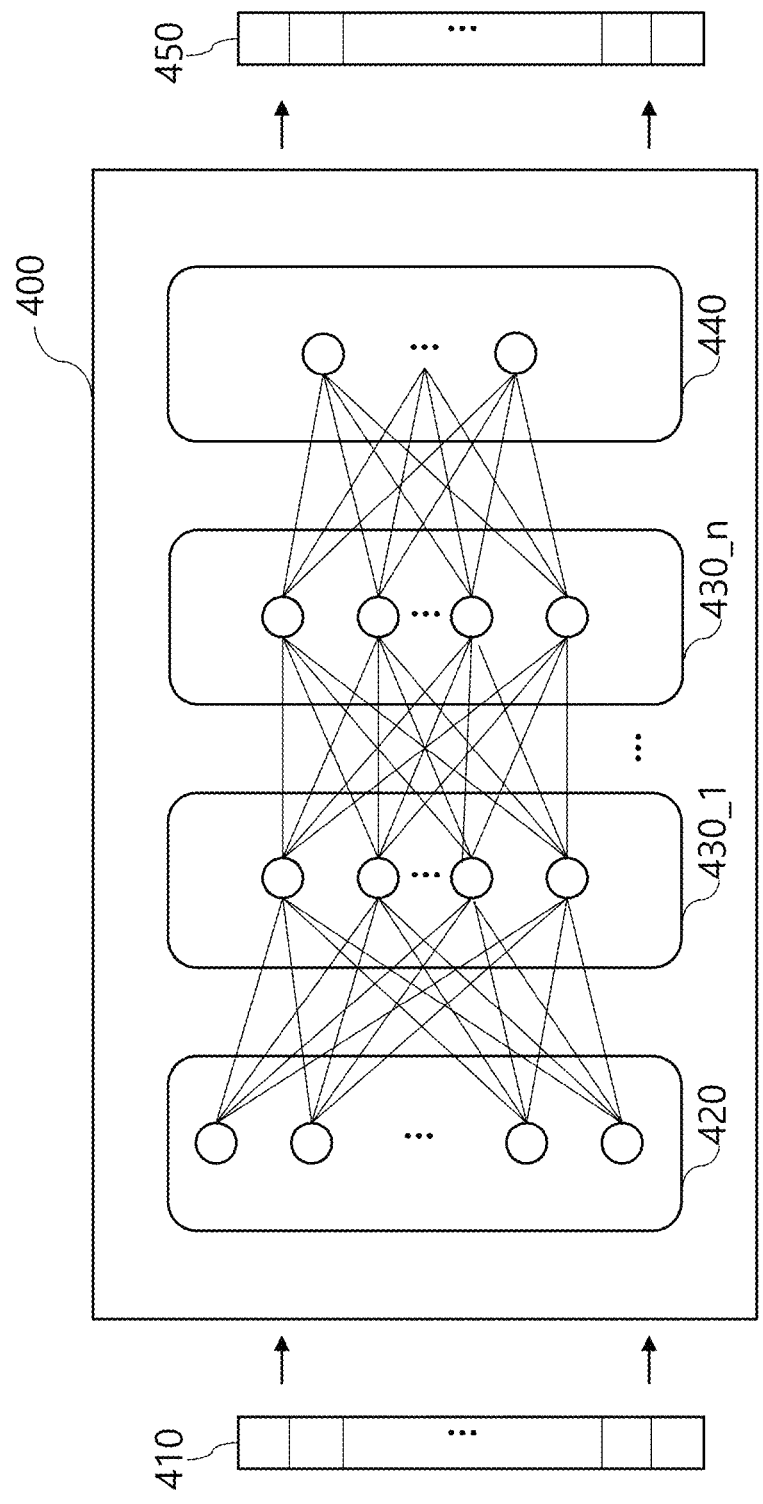
FIG. 4 is a schematic diagram showing a method of training an artificial neural network according to an embodiment of the present disclosure.

FIG. 4 is a schematic diagram showing a method of training an artificial neural network according to an embodiment of the present disclosure. In machine learning technology and cognitive science, an artificial neural network 400 refers to a statistical training algorithm implemented based on a structure of a biological neural network, or to a structure that executes such algorithm. That is, the artificial neural network 400 represents a machine learning model that acquires a problem solving ability by repeatedly adjusting the weights of synapses by the nodes that are artificial neurons forming the network through synaptic combinations as in the biological neural networks, thus training to reduce errors between a target output corresponding to a specific input and a deduced output.

In general, the artificial neural network is implemented as a multilayer perceptron (MLP) formed of multiple nodes and connections between them. The artificial neural network 400 according to the present embodiment may be implemented using one of various artificial neural network structures including the MLP. As shown in FIG. 4, the artificial neural network 400 includes an input layer 420 receiving an input signal or data 410 from the outside, an output layer 440 outputting an output signal or data 450 corresponding to the input data, and (n) number of hidden layers 430_1 to 430_$n$ positioned between the input layer 420 and the output layer 440 to receive a signal from the input layer 420, extract the features, and transmit the features to the output layer 440. Here, the output layer 440 receives signals from the hidden layers 430_1 to 430_$n$ and outputs them to the outside.

The training method of the artificial neural network 400 includes a supervised learning that trains for optimization for solving a problem with inputs of teacher signals (correct answer), and an unsupervised learning that does not require a teacher signal. The classifier 210 using the trained artificial neural network according to the present disclosure performs analysis on an input image using supervised learning to provide information on the estimated class probability distribution map 325 of the image, and trains the artificial neural network 400 capable of extracting information on image quality improvement (e.g., information on restoration, information on resolution improvement). As described above, the trained artificial neural network 400 may provide a basis for creating the output image 170 by creating an estimated class probability distribution map 325 in response to the received image.

According to an embodiment, as shown in FIG. 4, an input variable of the artificial neural network 400 capable of extracting the estimated class probability distribution map 325 may be the image 110. For example, the input variable input to the input layer 420 of the artificial neural network 400 may include an image vector 410 that includes the image 110 as one vector data element.

Meanwhile, the output variable output from the output layer 440 of the artificial neural network 400 may be a vector representing an estimated class probability distribution. According to an embodiment, the output variable may be configured with an estimated class probability distribution map vector 450. For example, the estimated class probability distribution map vector 450 may include the probability distribution for each class of each of the frequency channels of the image 110 as a data element.

As described above, the input layer 420 and the output layer 440 of the artificial neural network 400 are respectively matched with a plurality of output variables corresponding to a plurality of input variables, so as to adjust the synaptic values between nodes included in the input layer 420, the hidden layers 430_1 to 430_$n$, and the output layer 440, thereby training to extract the correct output corresponding to a specific input. Through this training process, the features hidden in the input variables of the artificial neural network 400 may be confirmed, and the synaptic values (or weights) between the nodes of the artificial neural network 400 may be adjusted so as to reduce the errors between the output variable calculated based on the input variable and the target output. By using this trained artificial neural network 400, an estimated class probability distribution map 325 may be created in response to the input image.

According to another embodiment, the input variable of the artificial neural network 400 may be a local patch that is a part divided from the image. The input variable input to the input layer 420 of the artificial neural network 400 may be a local patch vector. At this time, the output variable output from the output layer 440 of the artificial neural network 400 may be a vector representing an estimated discrete class probability distribution map of the local patch.

According to another embodiment, the input variable of the artificial neural network 400 creating an output image may be a feature map concatenated with a frequency map, and the output variable output from the output layer 440 of the artificial neural network 400 may be an output image vector.

Figure 5:
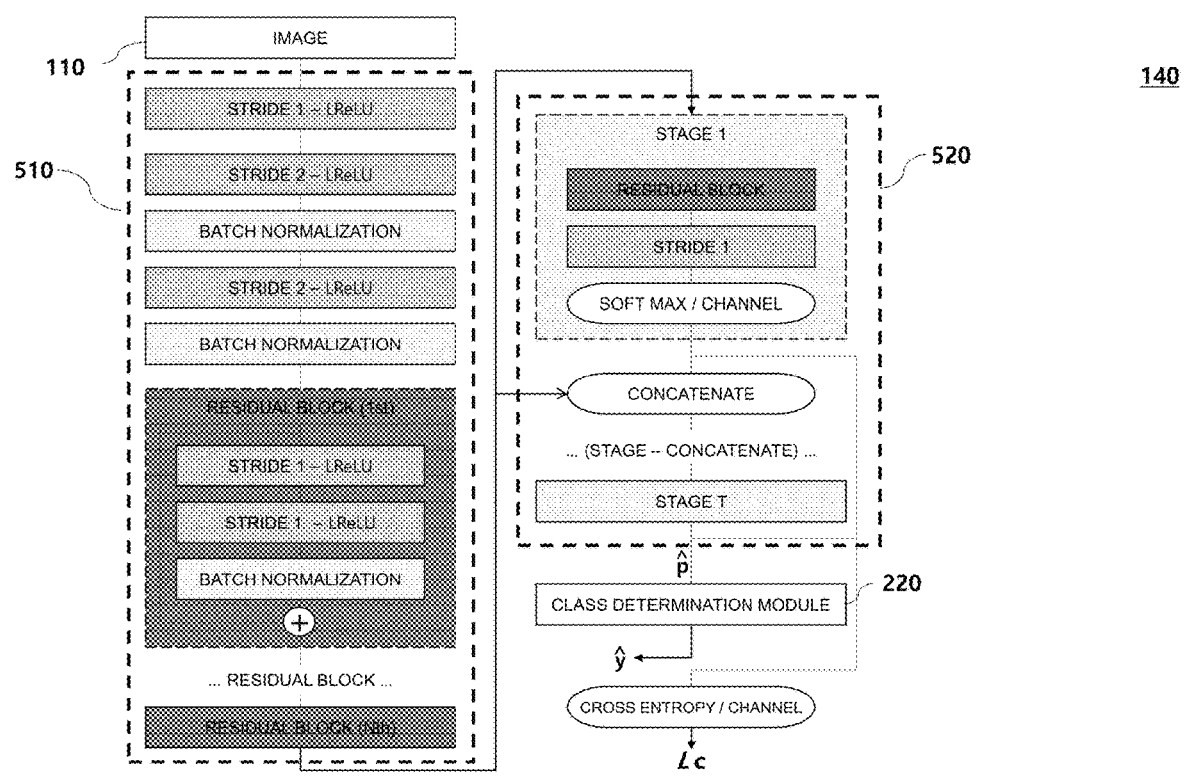
FIG. 5 is a flowchart showing a method of a classifier of a frequency processing module of creating an estimated class probability distribution map according to an embodiment of the present disclosure.

FIG. 5 is a flowchart showing a method of the classifier 210 of the frequency processing module of creating an estimated class probability distribution map according to an embodiment of the present disclosure. According to an embodiment, the classifier 210 may include a feature extractor 510 and a plurality of stage blocks 520. In an embodiment, each of the feature extractor 510 and the plurality of stage blocks 520 may be a combination of the components provided in the CNN, and the detailed configuration shown in FIG. 5 may be configured in various modified examples other than the illustrated example.

The feature extractor 510 may receive the image 110 to create a feature map and provide the result to the plurality of stage blocks 520. According to an embodiment, the process of creating the feature map may include a plurality of convolutions, active functions, batch normalizations and residual blocks, respectively. In an embodiment, the active function may be Leaky ReLU.

The plurality of stage blocks 520, which may be configured as a succession of a plurality of stage blocks, may receive a feature map and create an extracted class probability distribution map $\hat{p}$. The detailed configuration of the plurality of stage blocks 520 in FIG. 5 is not limited to the illustrated example, and various modifications are possible. The number of stage blocks may be variously determined to derive an effective result, and the plurality of stage blocks 520 may include two stage blocks, for example. With the extracted class probability distribution map $\hat{p}$, an extracted class map $\hat{y}$ may be created through the class determination module 220.

In an embodiment, each stage block may receive a feature map from the feature extractor 510. The stage block may be configured to create a class probability distribution map for each frequency channel. Furthermore, the stage block after stage 2 may concatenate the feature map with the class probability distribution map output from the previous stage block and use the result as an input image. Here, the class probability distribution map may be an output of softmax for each frequency channel. The class probability distribution may include a probability distribution that includes probabilities for each class.

According to an embodiment, cross entropy loss may be used to train the artificial neural network of the classifier 210. In an embodiment, the class loss $L_c$ at each stage may be calculated as the average of the cross entropy loss in all spatial blocks and frequency channels. The cross entropy loss may be calculated using a class probability distribution map and a ground truth class map. In addition, the final loss $L_c$ may be calculated as the average of each class loss. The cross entropy loss is closely related to KL-divergence and may be very important in matching the estimated class probability distribution map to the ground truth class map.

Figure 6:
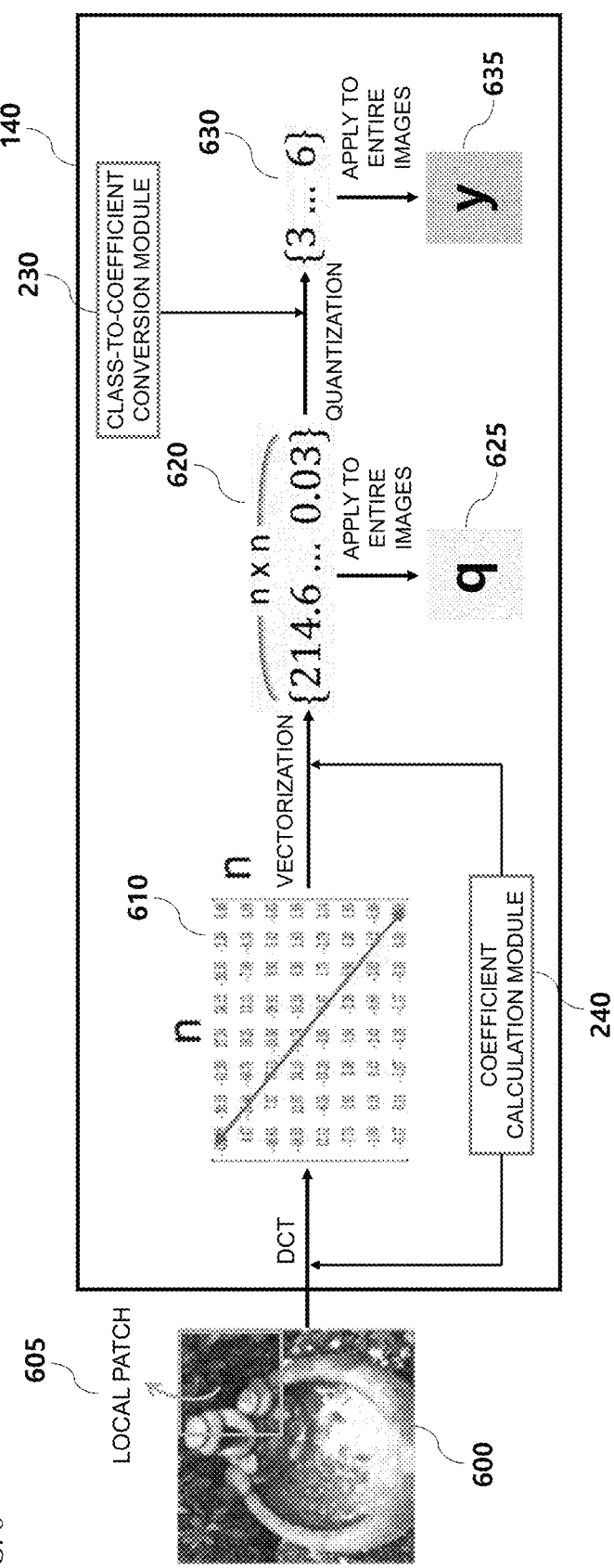
FIG. 6 is a schematic diagram showing a method of a frequency processing module of creating a ground truth coefficient map and a ground truth class map from a ground truth image according to an embodiment of the present disclosure.

FIG. 6 is a schematic diagram showing a method of the frequency processing module 140 of creating a ground truth coefficient map 625 and a ground truth class map 635 from a training ground truth image 600 according to an embodiment of the present disclosure. The training ground truth image 600 may be used as a ground truth, that is, a correct answer in the supervised training. The training ground truth image 600 may be used as a reference at various stages of the training. For example, the ground truth coefficient map 625 and the ground truth class map 635 created from the training ground truth image 600 may be used for training.

The coefficient calculation module 240 may perform conversion into the training ground truth frequency map 610 for each of the frequency channels by applying a conversion function to the training ground truth image 600. This conversion may include any conversion in at least one of the lossy compressed image and the image with a specific resolution described above. In FIG. 6, DCT used for compression such as JPEG and the like is shown as an example. In addition, the coefficient calculation module 240 may vectorize the training ground truth frequency map 610 to create a training ground truth coefficient map 620. By the vectorization, an n×n matrix may be represented as an n×n vector, for example. For example, a matrix may be vectorized according to the ZIGZAG algorithm.

The training ground truth image 600 received by the coefficient calculation module 240 may be the entire image or the local patch. In this case, the coefficient calculation module 240 may create a frequency map of the local patch and the ground truth coefficient map 620 of the local patch. Accordingly, the ground truth coefficient maps 620 of the local patch may be concatenated to create the ground truth coefficient map 625 for the entire training ground truth image. According to an embodiment, the ground truth coefficient map 625 may be used as a reference in training the first artificial neural network of the encoder 120 and/or the third artificial neural network of the decoder 160. The training of the first artificial neural network and/or the third artificial neural network is described in detail below with reference to FIG. 9.

The class-to-coefficient conversion module 230 may receive the ground truth coefficient map 625 or the ground truth coefficient map 620 of the local patch to create the ground truth class map 635 or the ground truth class map 630 of the local patch. The class-to-coefficient conversion module 230 may concatenate the ground truth class maps 630 for each of the plurality of local patches 605 to create the ground truth coefficient map 625 for the image 600. According to an embodiment, the ground truth class map 635 may be used as a reference in training the second artificial neural network of the frequency processing module 140.

Figure 7:
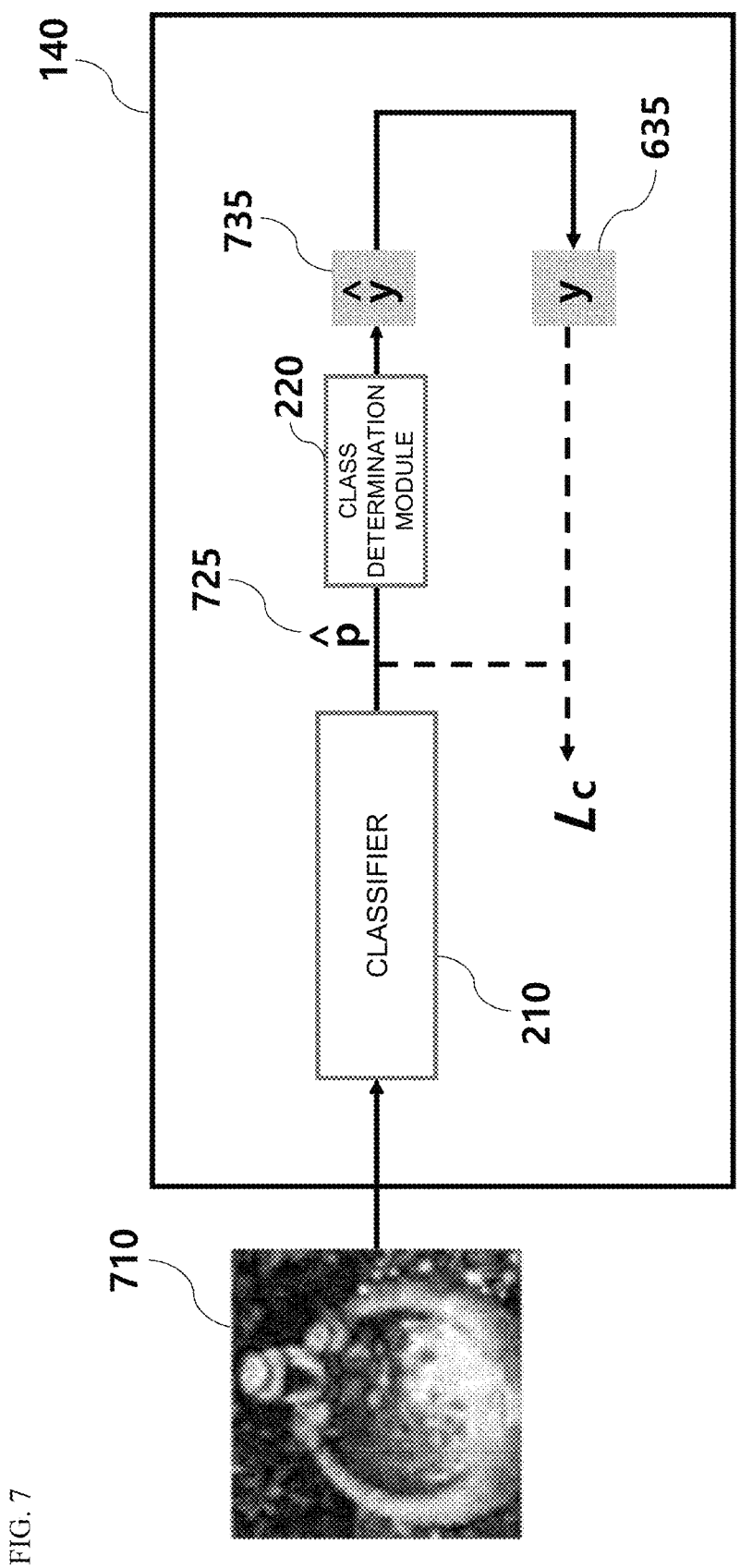
FIG. 7 is a schematic diagram showing a method of a frequency processing module of training a second artificial neural network according to an embodiment of the present disclosure.

FIG. 7 is a schematic diagram showing a method of the frequency processing module 140 of training a second artificial neural network according to an embodiment of the present disclosure.

According to an embodiment, the classifier 210 of the frequency processing module 140 may input a training image 710 into the trained second artificial neural network to output a training extracted class probability distribution map 725. Here, the training image 710 may be a compressed image or include an image having a specific resolution. Then, the class determination module 220 may be input to the output training extracted class probability distribution map 725 so that a training extracted class map 735 may be created.

According to an embodiment, the ground truth class map 635 may be created from a training ground truth image corresponding to the training image 710. The method of creating the ground truth class map 635 from the training image 710 will be described below in detail with reference to FIG. 10. Then, the loss $L_c$ between the training extracted class map 735 and the ground truth class map 635 may be calculated, and the second artificial neural network may be trained so that the loss $L_c$ is minimized.

In restoring an image using an artificial neural network, the approach of mainly minimizing the inter-pixel loss between the ground truth image and the output image may have a problem of blurry edge. In addition, a one-to-many functional relationship may pose a problem when creating a possible output image from an input image. In order to overcome this problem, the artificial neural network in an embodiment of the present disclosure treats the problem of image restoration as a problem of estimating coefficients of the ground truth image in the frequency domain. Specifically, the artificial neural network may be trained to estimate the probability distribution of the coefficients. For this training, KL-divergence method may be applied. Use of the KL-divergence method for the equation used for image restoration provides a better effect than the case of using the mean square error (MSE). A plurality of different output images (e.g., restored image, image with improved resolution, and the like) may be created from the input image (e.g., from the lossy compressed image or the image with a specific resolution), and it would be difficult to train the artificial neural network when an attempt is made to directly estimate the target image using a set of two pairs of original images and compressed images as training samples, for example. Since the artificial neural network creates one output, it may not be suitable for solving a problem in which a plurality of output images are created from one input image. On the other hand, when training to estimate the probability distribution from the same training sample, training may be performed so as to derive a bimodal distribution having two peaks. The technical configuration used to restore the compressed image may also be applied to a configuration that increases the resolution of the image.

According to an embodiment, the classifier 210 may be trained to create a probability distribution map for each of the classes corresponding to the coefficients of the frequency domain of the conversion function. In an embodiment, the class may be set appropriately to derive an effective result. For example, the class may be designated to be an odd-numbered class that includes a coefficient 0 as the median value, and the class may be set to have 7 classes from classes 0 to 6 for excellence in terms of both the processing speed and the reliability in results of the artificial neural network.

Figure 8:
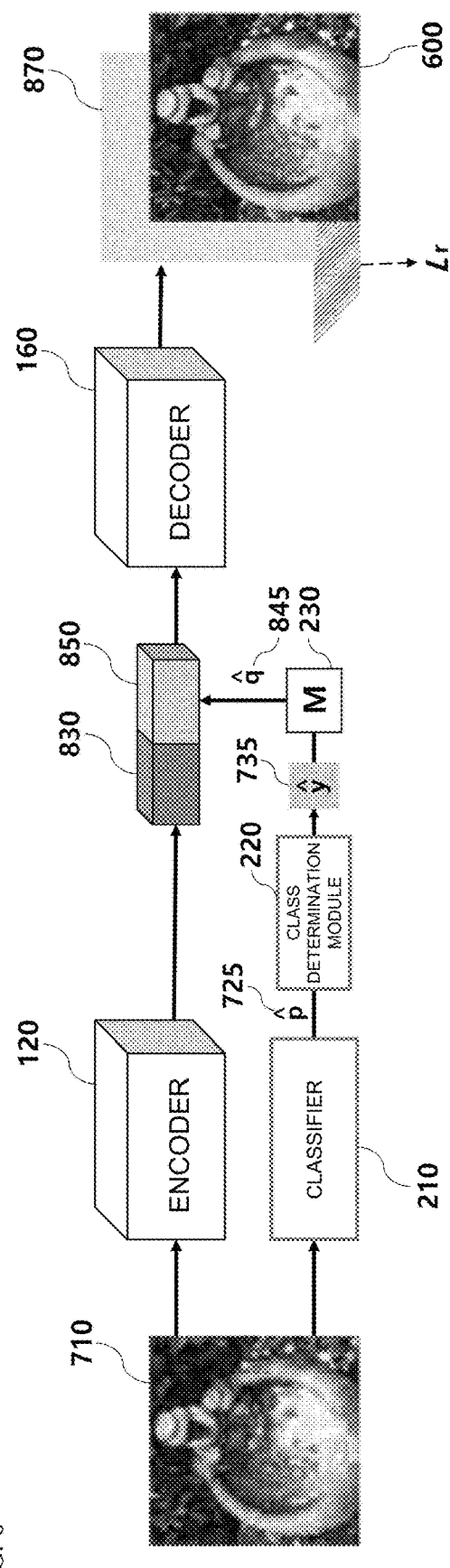
FIG. 8 is a schematic diagram showing a method of an apparatus according to an embodiment of the present disclosure of concatenating a training estimated frequency map created by a frequency processing module with a training feature map created by an encoder, and creating a training output image based on the training concatenated feature map and obtaining a loss from a training ground truth image and performing training.

FIG. 8 is a schematic diagram showing a method of an apparatus according to an embodiment of the present disclosure of concatenating the training estimated frequency map 850 created by the frequency processing module with the training feature map 830 created by the encoder 120, and creating a training output image 870 based on the training concatenated feature map and obtaining a loss from the training ground truth image 600 and performing training. According to an embodiment, the method of training the artificial neural network included in at least one of the encoder 120 and the decoder 160 may include, first, inputting the training image 710 into the encoder 120 to create the training feature map 830. Subsequently, the training image 710 may be input to the classifier 210 as an input variable so that the training extracted class probability distribution map 725 for each of the frequency channels may be created.

According to an embodiment, the class determination module 220 may be configured to determine a class for each of the frequency channels based on the probability distribution included in the training extracted class probability distribution map 725, and create a training extracted class map 735 that includes the determined class. The class-to-coefficient conversion module (230 or M) may be configured to receive the training extracted class map 735 and create a training estimated coefficient map 845. The training estimated coefficient map 845 may be converted into a training estimated frequency map 850. Alternatively, the training estimated coefficient map 845 may be used as the training estimated frequency map 850. The training estimated frequency map 850 may be concatenated with the training feature map 830 so that a training concatenated feature map may be created. The decoder 160 may be configured to input the training concatenated feature map to the third artificial neural network as an input variable to create a training output image 870. With the resultant training output image 870, at least one of the first and third artificial neural networks included in at least one of the encoder 120 and the decoder 160 may be trained in order to minimize the loss between the training output image 870 and the corresponding training ground truth image 600.

While the encoder 120 creates the feature map of the input image, the frequency processing module 140 creates the frequency map having frequency domain data. Accordingly, the artificial neural network included in the decoder 160 is trained on the method of mapping the frequency domain to the pixel domain.

There may remain a significant amount of low frequency data of the image 110 without loss. Accordingly, while the training estimated frequency map 850 created through the frequency processing module 140 is used to restore the lost high-frequency data, a significant amount of low-frequency data may be available from the data of the received image 110. According to an embodiment, in concatenating the training estimated frequency map 850 with the training feature map 830, the data of the training estimated frequency map 850 may be concatenated with the training feature map 830 so that it may be the data in the high frequency domain.

Figure 9:
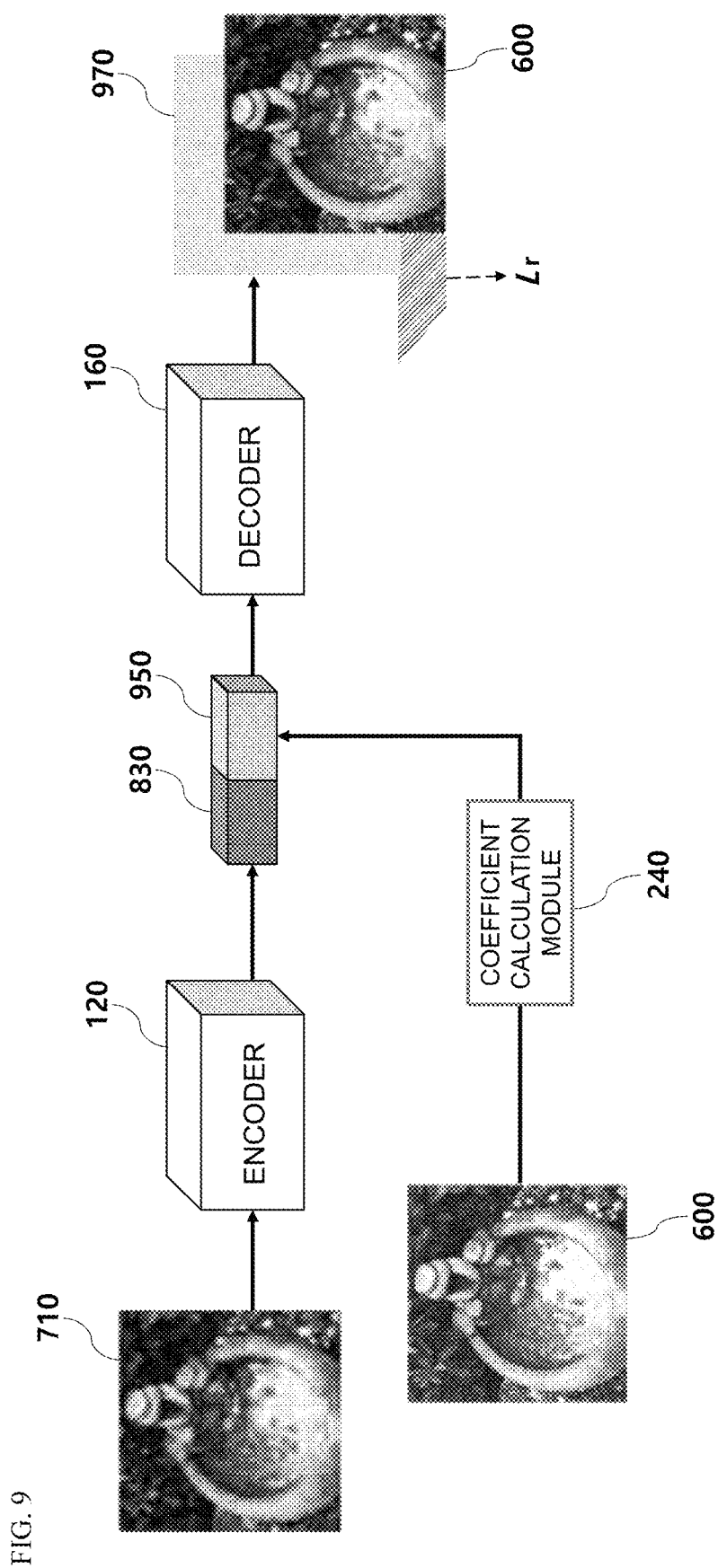
FIG. 9 is a schematic diagram showing a method of an apparatus according to an embodiment of the present disclosure of concatenating a ground truth frequency map with a training feature map created by an encoder, and creating a training output image based on the training concatenated feature map and obtaining a loss from a training ground truth image and performing training.

FIG. 9 is a schematic diagram showing a method of an apparatus according to an embodiment of the present disclosure of concatenating the ground truth frequency map with the training feature map created by the encoder, and creating the training output image based on the training concatenated feature map and obtaining a loss from the training ground truth image and performing training. The training image 710 is an image corresponding to the training ground truth image 600 and may represent an input image (e.g., a compressed image or an image having a specific resolution) of the training ground truth image 600.

The encoder 120 may receive the training image 710 and create the training feature map 830 using the first artificial neural network. In addition, the coefficient calculation module 240 may be configured to apply the conversion function to the training ground truth image 600 to create a ground truth frequency map 950 of the conversion function for each of the frequency channels. Here, the ground truth frequency map 950 may be a coefficient map for each of the frequency channels or may include a map having a form obtained by processing such a coefficient map. Subsequently, the ground truth frequency map 950 created from the coefficient calculation module 240 may be concatenated with the training feature map 830 and provided to the decoder 160.

The decoder 160 may be configured to receive the training concatenated feature map and input the received training concatenated feature map to the third artificial neural network to create a training output image 900. Then, the artificial neural network included in at least one of the first artificial neural network included in the encoder 120 and the second artificial neural network included in the decoder 160 may be trained in order to minimize the loss between the training output image 900 and the training ground truth image 600.

Since the coefficients of the training estimated frequency map are values estimated through training and are representative values corresponding to the classes, training through the two-stage training process may lack precision. Accordingly, in the process of training the encoder-decoder, it is possible to train so as to create an effective and accurate output image by using the ground truth frequency map 950 created by converting the training ground truth image 600, rather than creating the training output image by using the training estimated frequency map 850 created based on the training extracted class probability distribution map 725 created in the artificial neural network of the classifier 210.

Figure 10:
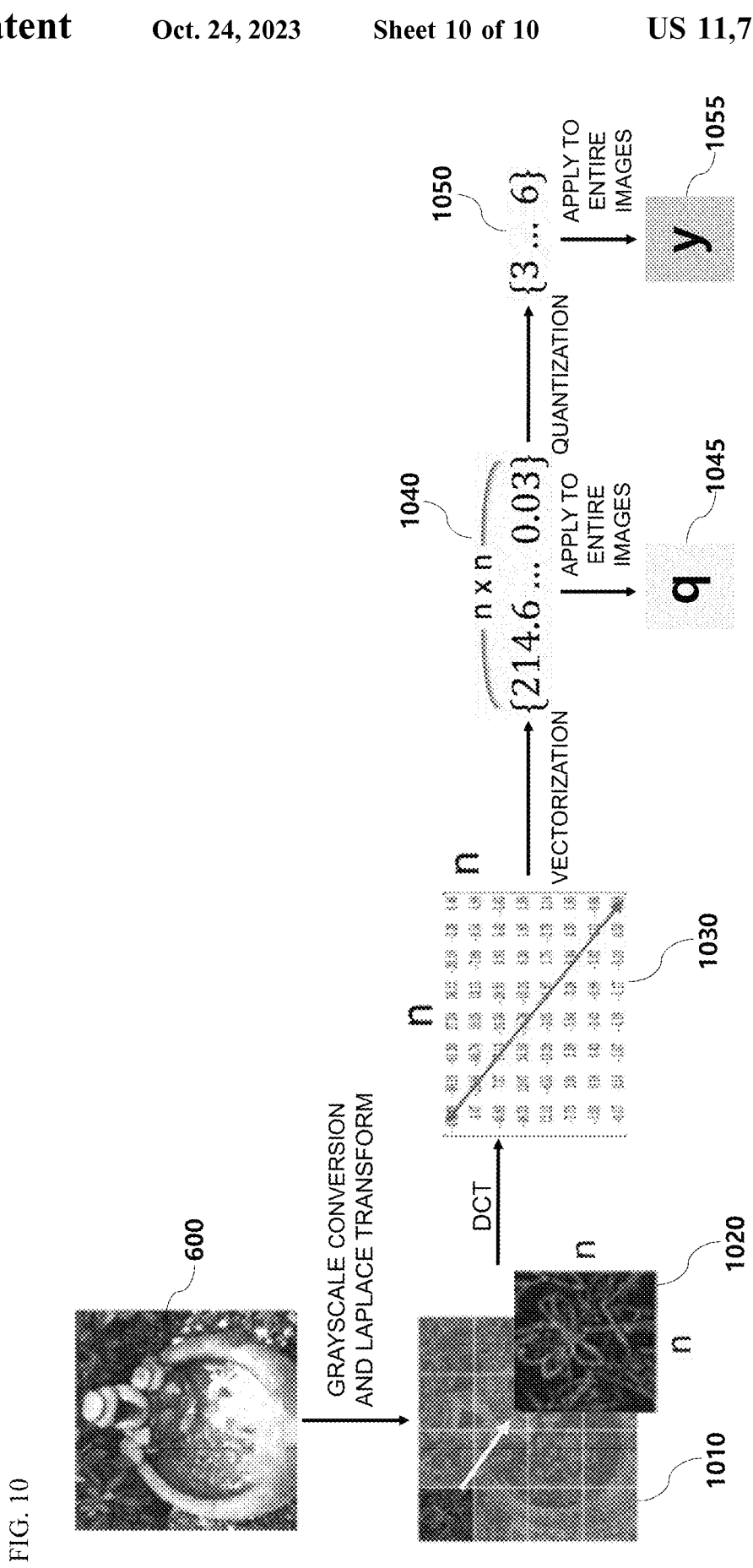
FIG. 10 is a schematic diagram showing a method of an apparatus according to an embodiment of the present disclosure of converting a training ground truth image and creating a ground truth coefficient map and a ground truth class map based on the converted training ground truth image.

FIG. 10 is a schematic diagram showing a method of an apparatus according to an embodiment of the present disclosure of converting the training ground truth image and creating the ground truth coefficient map and the ground truth class map based on the converted training ground truth image. The training ground truth image 600 may be converted such that at least one of an edge and a texture of an object stands out. According to an embodiment, converting the training ground truth image so that at least one of an edge and a texture of an object included in the training ground truth image 600 stands out, may include converting a color image to grayscale. In this case, it is sufficient to process only one grayscale channel, in contrast to the color image that requires processing of each of the three channels of RGB. According to another embodiment, the training ground truth image 600 may be converted through Laplace transform such that the edge or the texture stands out. A converted training image 1010 may be created through the conversion of the training ground truth image 600. In addition, high-frequency data, which is mainly lost in the lossy compression process, is used to represent the edge or the texture of an object in an image. Accordingly, when processing is performed with a focus on the data of the edge or the texture, training centered on high-frequency data may be employed, and with this, the lost high-frequency data may be effectively restored. This restoration method may also be applied to the process of improving the resolution of an image.

According to an embodiment, the converted training image 1010 may be divided into a plurality of local patches 1020. A conversion function (for example, a DCT function) may be applied to each of the plurality of local patches 1020 to create a frequency map 1030. Then, the created ground truth frequency map 1030 may be vectorized so that a ground truth coefficient map 1040 for each of the frequency channels may be created. A ground truth coefficient map 1045 corresponding to the training ground truth image 600 may be created based on the ground truth coefficient map 1040 corresponding to each of the plurality of local patches 1020. In the present disclosure, although it is described that the ground truth coefficient maps 1040 and 1045 and the ground truth frequency map 1030 have different configurations from each other, the ground truth frequency map may include the ground truth coefficient maps 1040 and 1045.

According to an embodiment, the ground truth coefficient map 1040 corresponding to each of the plurality of local patches 1020 may be input to the class-to-coefficient conversion module 230 so that a ground truth class map 1050 may be created. By concatenating the ground truth class maps 1050, a ground truth class map 1055 corresponding to the training ground truth image 600 may be created. The ground truth class map 1055 may be used to train the second artificial neural network included in the frequency processing module 140.

In general, a computing device for processing an image to improve image quality described herein may also represent various types of devices, such as wireless telephones, cellular telephones, laptop computers, wireless multimedia devices, wireless communication personal computer (PC) cards, PDAs, external modems, internal modems, devices in communication over a wireless channel, and the like. The device may have various names, such as access terminal (AT), access unit, subscriber unit, mobile station, mobile device, mobile unit, mobile phone, mobile, remote station, remote terminal, remote unit, user device, user equipment, handheld device, and the like. Any device described herein may have hardware, software, firmware, or combinations thereof as well as memory for storing instructions and data.

The techniques described herein may be implemented by various means. For example, these techniques may be implemented in hardware, firmware, software, or a combination thereof. Those skilled in the art will further appreciate that the various illustrative logical blocks, modules, circuits, and algorithm steps described in connection with the disclosure herein may be implemented in electronic hardware, computer software, or combinations of both. To clearly illustrate this interchangeability of hardware and software, various illustrative components, blocks, modules, circuits, and steps have been described above generally in terms of their functionality. Whether such a function is implemented as hardware or software varies depending on design constraints imposed on the particular application and the overall system. Those skilled in the art may implement the described functions in varying ways for each particular application, but such decisions for implementation should not be interpreted as causing a departure from the scope of the present disclosure.

In a hardware implementation, processing units used to perform the techniques may be implemented in one or more ASICs, DSPs, digital signal processing devices (DSPDs), programmable logic devices (PLDs), field programmable gate arrays (FPGAs), processors, controllers, microcontrollers, microprocessors, electronic devices, other electronic units designed to perform the functions described herein, computer, or a combination thereof.

Accordingly, various example logic blocks, modules, and circuits described in connection with the disclosure herein may be implemented or performed with general purpose processors, DSPs, ASICs, FPGAs or other programmable logic devices, discrete gate or transistor logic, discrete hardware components, or any combination of those designed to perform the functions described herein. A general purpose processor may be a microprocessor, but in the alternative, the processor may be any conventional processor, controller, microcontroller, or state machine. The processor may also be implemented as a combination of computing devices, for example, a DSP and microprocessor, a plurality of microprocessors, one or more microprocessors associated with a DSP core, or any other combination of such configurations.

In the implementation using firmware and/or software, the techniques may be implemented with instructions stored on a computer readable medium, such as random access memory (RAM), read-only memory (ROM), non-volatile random access memory (NVRAM), programmable read-only memory (PROM), erasable programmable read-only memory (EPROM), electrically erasable PROM (EEPROM), flash memory, compact disc (CD), magnetic or optical data storage devices, and the like. The instructions may be executable by one or more processors, and may cause the processor(s) to perform certain aspects of the functions described herein.

When implemented in software, the functions may be stored on a computer readable medium as one or more instructions or codes, or may be transmitted through a computer readable medium. The computer readable medium includes both the computer storage medium and the communication medium including any medium that facilitate the transfer of a computer program from one place to another. The storage media may also be any available media that may be accessed by a computer. By way of non-limiting example, such a computer readable medium may include RAM, ROM, EEPROM, CD-ROM or other optical disk storage, magnetic disk storage or other magnetic storage devices, or any other media that can be used to transfer or store desired program code in the form of instructions or data structures and can be accessed by a computer. Also, any connection is properly referred to as a computer readable medium.

For example, when the software is transmitted from a website, server, or other remote sources using coaxial cable, fiber optic cable, twisted pair, digital subscriber line (DSL), or wireless technologies such as infrared, wireless, and microwave, the coaxial cable, the fiber optic cable, the twisted pair, the digital subscriber line, or the wireless technologies such as infrared, wireless, and microwave are included within the definition of the medium. The disks and the discs used herein include CDs, laser disks, optical disks, digital versatile discs (DVDs), floppy disks, and Blu-ray disks, where disks usually magnetically reproduce data, while discs optically reproduce data using a laser. The combinations described above should also be included within the scope of the computer readable media.

The software module may reside in RAM memory, flash memory, ROM memory, EPROM memory, EEPROM memory, registers, hard disk, removable disk, CD-ROM, or any other form of storage medium known. An exemplary storage medium may be coupled to the processor, such that the processor may read information from or write information to the storage medium. Alternatively, the storage medium may be integrated into the processor. The processor and the storage medium may exist in the ASIC. The ASIC may exist in the user terminal. Alternatively, the processor and storage medium may exist as separate components in the user terminal.

The above description of the present disclosure is provided to enable those skilled in the art to make or use the present disclosure. Various modifications of the present disclosure will be readily apparent to those skilled in the art, and the generic principles defined herein may be applied to various modifications without departing from the spirit or scope of the present disclosure. Thus, the present disclosure is not intended to be limited to the examples described herein but is intended to be accorded the broadest scope consistent with the principles and novel features disclosed herein.

Although example implementations may refer to utilizing aspects of the presently disclosed subject matter in the context of one or more standalone computer systems, the subject matter is not so limited, and they may be implemented in conjunction with any computing environment, such as a network or distributed computing environment. Furthermore, aspects of the presently disclosed subject matter may be implemented in or across a plurality of processing chips or devices, and storage may be similarly influenced across a plurality of devices. Such devices may include PCs, network servers, and handheld devices.

Although the subject matter has been described in language specific to structural features and/or methodological acts, it will be understood that the subject matter defined in the appended claims is not necessarily limited to the specific features or acts described above. Rather, the specific features and acts described above are described as example forms of implementing the claims.

Although the method mentioned herein has been described through specific embodiments, it is possible to implement it as computer readable code on a computer readable recording medium. The computer readable recording medium includes all kinds of recording devices in which data readable by a computer system is stored. Examples of computer readable recording medium include ROM, RAM, CD-ROM, magnetic tape, floppy disk, and optical data storage device, and the like. In addition, the computer readable recording medium may be distributed over network coupled computer systems so that the computer readable code is stored and executed in a distributed manner. Further, programmers in the technical field pertinent to the present disclosure will be easily able to envision functional programs, codes and code segments to implement the embodiments.

Although the present disclosure has been described in connection with some embodiments herein, it should be understood that various modifications and changes can be made without departing from the scope of the present disclosure, which can be understood by those skilled in the art to which the present disclosure pertains. In addition, such modifications and changes should be considered within the scope of the claims appended herein.

What is claimed is:

1. A method of processing an image for improving image quality, which is run on a computing device, the method comprising:

inputting a training image to a first artificial neural network as an input variable to create a training feature map;

inputting a training ground truth image corresponding to the training image to a coefficient calculation module of a second artificial neural network to obtain a training ground truth frequency map for each of frequency channels, the training ground truth image being different from the training image;

concatenating the training ground truth frequency map with the training feature map to create a training concatenated feature map;

inputting the training concatenated feature map into a third artificial neural network as an input variable to create a training output image;

training the first artificial neural network and the third artificial neural network in order to minimize loss between the training output image and the training ground truth image;

inputting the image into the trained first artificial neural network as an input variable to create a feature map;

inputting the image to the second artificial neural network as an input variable to create an estimated class probability distribution map for each of frequency channels;

determining a class for each of the frequency channels based on a probability distribution included in the estimated class probability distribution map and creating an estimated class map that includes the determined class, wherein the class for each of the frequency channels is a class classified according to a DCT coefficient range for each of frequency channels associated with the image;
converting the estimated class map into an estimated frequency map;
concatenating the estimated frequency map with the feature map to create a concatenated feature map; and
inputting the concatenated feature map into the trained third artificial neural network as an input variable to create an output image.

2. The method of processing an image according to claim 1,
wherein the output image includes at least one of an image obtained by restoring the image and an image obtained by improving a resolution of the image.

3. The method of processing an image according to claim 1,
wherein the creating the training ground truth frequency map includes:
creating a training converted ground truth image by converting the training ground truth image such that at least one of an edge and a texture of an object included in the training ground truth image makes visually noticeable; and
creating a ground truth coefficient map of a conversion function for each of the frequency channels by applying the conversion function to the training converted ground truth image.

4. A method of training an artificial neural network, which is run on a computing device and used to create a class map for improving image quality, the method comprising:
inputting a training image to a first artificial neural network as an input variable to create a training feature map;
creating a training ground truth frequency map for each of frequency channels by applying a conversion function of a second artificial neural network to a training ground truth image, the training ground truth image being different from the training image;
concatenating the training ground truth frequency map with the training feature map to create a training concatenated feature map;
inputting the training concatenated feature map into a third artificial neural network as an input variable to create a training output image; and
training the first artificial neural network and the third artificial neural network in order to minimize loss between the training output image and the training ground truth image.

5. The method of training an artificial neural network according to claim 4,
wherein the creating the training ground truth frequency map includes:
creating a training converted ground truth image by converting the training ground truth image such that at least one of an edge and a texture of an object included in the training ground truth image makes visually noticeable; and
creating a ground truth coefficient map of the conversion function for each of the frequency channels by applying the conversion function to the training converted ground truth image.

6. A computing device that processes an image to improve image quality, comprising:

an encoder configured to input the image to a first artificial neural network as an input variable to create a feature map;
a frequency processing module configured to receive the image and create an estimated frequency map based on the image;
a concatenating module configured to concatenate the estimated frequency map with the feature map to create a concatenated feature map; and
a decoder configured to input the concatenated feature map to a third artificial neural network as an input variable to create a restored image,
wherein the frequency processing module includes:
a classifier configured to input the image to a second artificial neural network as an input variable to create an estimated class probability distribution map for each of frequency channels;
a class determination module configured to determine a class for each of the frequency channels based on a probability distribution included in the estimated class probability distribution map to create an estimated class map that includes the determined class, wherein the class for each of the frequency channels is a class classified according to a DCT coefficient range for each of frequency channels associated with the image; and
a class-to-coefficient conversion module configured to convert the estimated class map into the estimated frequency map, wherein
the first artificial neural network and the third artificial neural network have been trained by:
inputting a training image to the first artificial neural network as an input variable to create a training feature map;
inputting a training ground truth image corresponding to the training image to a coefficient calculation module of the second artificial neural network to obtain a training ground truth frequency map for each of frequency channels, the training ground truth image being different from the training image;
concatenating the training ground truth frequency map with the training feature map to create a training concatenated feature map;
inputting the training concatenated feature map into the third artificial neural network as an input variable to create a training output image;
training the first artificial neural network and the third artificial neural network in order to minimize loss between the training output image and the training ground truth image.

7. The computing device according to claim 6, wherein:
the coefficient calculation module creates a ground truth frequency map for each of frequency channels by applying a conversion function to a training ground truth image.

8. The computing device according to claim 7,
wherein the coefficient calculation module is further configured to create a training converted ground truth image by converting the training ground truth image such that at least one of an edge and a texture of an object included in the training ground truth image makes visually noticeable, and create a ground truth coefficient map of the conversion function for each of the frequency channels by applying the conversion function to the training converted ground truth image.

* * * * *